H. A. AHNERT.
SHOCK ABSORBER.
APPLICATION FILED SEPT. 30, 1913.
1,112,961.
Patented Oct. 6, 1914.
2 SHEETS—SHEET 1.
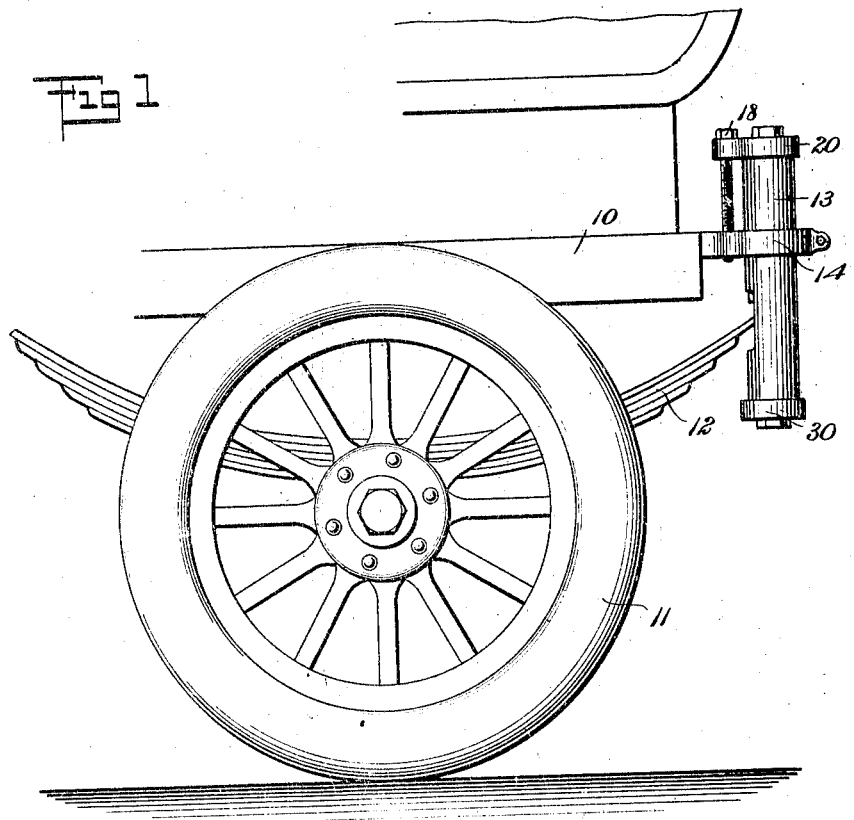
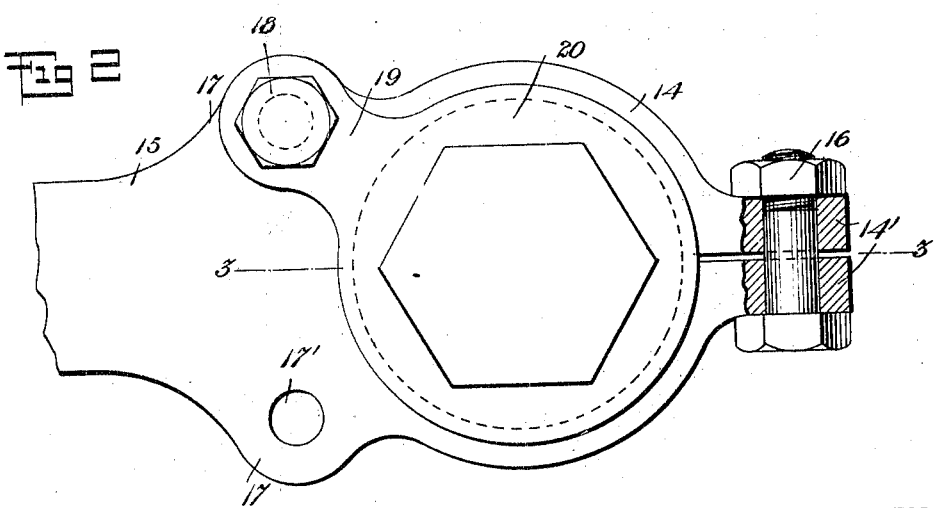
WITNESSES
C. J. Hachenberg
Geo. L. Beel
INVENTOR
Henry A. Ahnert
BY Munn & Co
ATTORNEYS

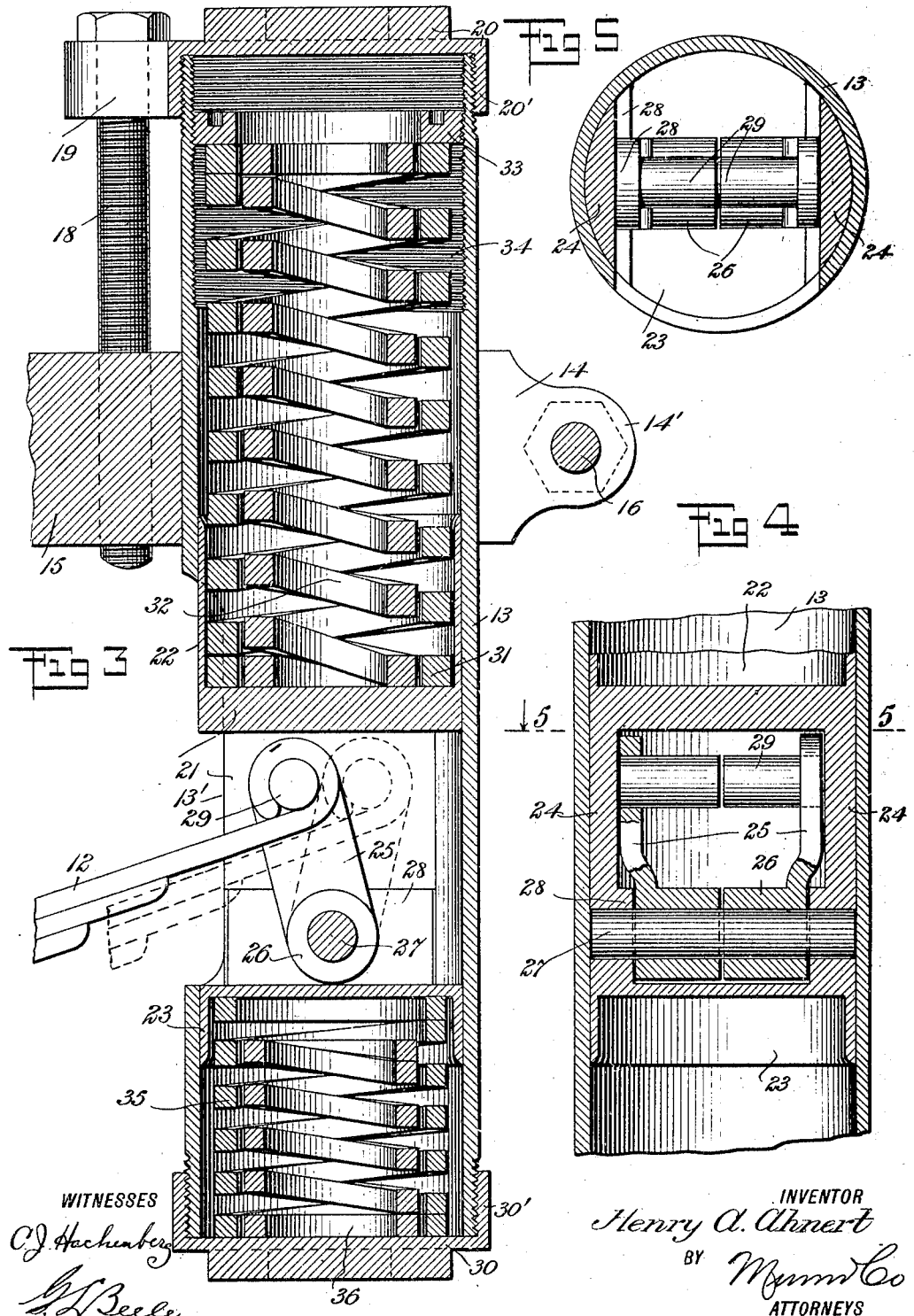

UNITED STATES PATENT OFFICE.

HENRY ALBERT AHNERT, OF NEW YORK, N. Y.

SHOCK-ABSORBER.

1,112,961.

Specification of Letters Patent.    Patented Oct. 6, 1914.

Application filed September 30, 1913.   Serial No. 792,604.

*To all whom it may concern:*

Be it known that I, HENRY ALBERT AHNERT, a citizen of the United States, and a resident of the city of New York, borough of Manhattan, in the county and State of New York, have invented a new and Improved Shock-Absorber, of which the following is a full, clear, and exact description.

This invention relates to springs or cushioning devices for vehicles and has particular reference to means for relieving a motor vehicle especially from the objectionable bouncing due to rapid travel over rough or uneven roadways.

More particularly stated, the invention comprises a shock absorber including a casing clamped adjustably to a vehicle frame, said casing carrying a plurality of springs of different weights between or among which is interposed a piston slidable vertically in said casing to which the main vehicle spring is connected, the arrangement being such as to make it adaptable for use in connection with varying loads upon the same vehicle.

The foregoing and other objects of the invention will hereinafter be more fully described and claimed and illustrated in the drawings forming a part of this specification in which like characters of reference indicate corresponding parts in all the views, and in which—

Figure 1 is a side elevation of a portion of a vehicle equipped with my improvement; Fig. 2 is a plan view of the casing cap and a bracket to support the casing, a portion of the bracket being broken away; Fig. 3 is a vertical section on the line 3—3 of Fig. 2; Fig. 4 is a partial vertical section at right angles to Fig. 3 and looking toward the right in said figure; and Fig. 5 is a transverse section on the line 5—5 of Fig. 4.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring particularly to the drawings I show at 10 a fragment of a vehicle frame supported upon wheels 11 and having any suitable main springs 12.

Instead of the end of the main spring 12 being connected directly to the frame I provide a cushioning device or shock absorber comprising a casing 13 of tubular form shown herein as cylindrical, but to this I do not wish to be unnecessarily limited. The casing is clamped at 14 in a bracket 15 secured to and extending preferably rearwardly of the main frame 10 of the vehicle. A bolt 16 passing through the lugs 14' of the clamp 14 serves to secure the casing to the bracket at least in part. Any suitable number of these shock absorbers may be employed in any one vehicle and at least one will be arranged at each rear corner thereof. Each bracket is provided with a pair of ears 17 having vertical screw threaded holes 17' through one of which a lifting screw 18 passes, the upper portion of the screw coöperating with a hub 19 extending from the cap 20 at the upper end of the casing. Said screw 18 may be arranged to coöperate with either of the holes of the ears 17, and if it is used in connection with the one on the outer side, the remaining hole left open may be employed for the attachment of luggage or other devices to the rear end of the vehicle. Fig. 2 in this respect may be considered as showing the cap on the remote side of the vehicle. The screw 18 has free or smooth engagement with the hub 19, and when rotated in one direction by means of a wrench, the bolt 16 being sufficiently loose for this purpose, the casing 13 may be forced downwardly with respect to the frame so as to accommodate the position of the frame with respect to the main springs or axles to a heavier load than might be accommodated under ordinary conditions. The screw, therefore, serves as an auxiliary means to secure the casing in any desired position of adjustment with respect to the bracket 15.

A plunger 21 somewhat in the nature of a piston is fitted for longitudinal reciprocations within the casing 13. Said plunger comprises upper and lower cups 22 and 23 spaced from each other and connected by a pair of parallel straps 24. The space between the straps 24 transversely and between the bottoms of the cups 22 and 23 vertically is designed to accommodate a pair of pivoted links 25 constituting a hanger within the plunger for the support of the main spring 12 of the vehicle. Each of these links includes a hub 26 journaled for oscillation upon a transverse pin 27 carried by enlargements or shoulders 28 at the lower ends of the straps 24, and each link also includes a pin or stud 29 for pivotal engagement with the end of the spring. It will be noted, furthermore, that the hanger connections between the end of the spring and the plunger provide free vertical reciprocations of the plunger and the necessary action of the spring.

As above noted, a cap 20 is arranged at the upper end of the casing. It is connected thereto by means of a screw threaded flange 20' detachably connected to corresponding screw threads on the exterior of the upper end of the casing. A cap 30 having a similar flange 30' is connected in a similar manner to the lower end of the casing, the cap 30, however, does not include the hub 19. The means for normally resisting the sliding or reciprocating movement of the plunger within the casing includes a plurality of springs shown herein as two in number seated in each of the cups and coöperating or adapted to coöperate with the several end caps. The main cushioning springs in the casing are shown at 31 and 32, both of which are seated in the cup 22 and one of them is adjustable as to effective strength by means of a nut or runner 33 having screw threaded engagement with the interior of the upper end of the casing, such threads being indicated at 34 and extending to a considerable distance downwardly. The spring 31, therefore, is designed to be strong enough to normally sustain the normal minimum load and hence constitutes the normal connection between the vehicle body or frame and the main spring 12. If the vehicle is loaded lightly, the spring 31 will act to sustain the normal load and will have in this way practically the same effect as a heavier spring would in sustaining a heavier load, it being well understood that a vehicle spring arranged for a heavy load is uncomfortable when carrying a light load. The auxiliary spring 32 is shorter than the normal space between the bottom of the cup 22 and the cap 20 and hence does not come into play until a considerable amount of pressure has been exerted upon the main cushioning spring 31, causing it to contract. In other words, when additional load is placed upon the vehicle or the vehicle encounters an obstruction along the way, the auxiliary spring 32 is then brought into play assisting in relieving the extra strain from the main cushioning spring 31.

The tendency for the vehicle body to bounce as a result of encountering an obstruction is resisted by the springs 35 and 36 seated between the cap 30 and the cup 23 at the lower end of the casing. These springs also are of different lengths, and, as shown, the spring 35 is intended to be always in engagement with the cup 23 as well as the cap 30 and serves therefore to always resist any tendency for the vehicle to bounce. Any excess tendency, however, of this nature will be received and resisted by the additional spring 36. These pairs of springs, it will be noted, are coiled one within the other reversely so as to prevent any serious abrasion or rubbing between them. The side of the casing adjacent the main spring is cut away for the spring to pass into connection with the link 25 as noted at 13'.

Having thus described my invention, I claim as new and desire to secure by Letters Patent:

1. The combination with the frame and a main spring of a vehicle, of a cushioning device therefor comprising a tubular casing, means to clamp the casing adjustably to the frame, said casing having an opening on the side to admit the spring, a plunger adapted to reciprocate within the casing, said plunger comprising oppositely arranged spaced cups, hanger means comprising a pair of links pivoted within the plunger to oscillate between said cups and supporting the end of the spring, and variably effective cushioning devices seated in said cups and extending oppositely therefrom into coöperation with the opposite portions of the casing.

2. The combination with a vehicle frame and a main spring, of a shock absorber comprising a tubular vertically arranged casing, a clamping bracket connected to the frame and surrounding the casing, a lifting screw coöperating between the upper end of the casing and said bracket for varying the vertical position of the casing with respect to the frame, a plunger within the casing, means to connect the end of the spring to the plunger for movement vertically within the casing, said plunger comprising a pair of oppositely arranged spaced cups, and a pair of coil springs seated in each of the cups and extending thence toward the end of the casing, the springs of one pair being heavier than those of the other and the springs of each pair being coiled reversely, substantially as set forth.

3. The combination with a vehicle frame and a main spring, of a shock absorber comprising a tubular casing having an open side, a clamp extending from the frame and embracing the casing and adjustably secured thereto, said casing having caps secured at its opposite ends, one of said caps having a projecting hub, a screw passing freely through said hub and threaded into said frame clamp for the purpose of adjusting the casing longitudinally through the clamp, a plunger within the casing and slidable longitudinally thereof, said plunger having an open space registering with the casing opening, means to pivotally connect the end of said main spring to the plunger through said openings, and cushioning devices between the plunger and said casing caps.

4. In a device of the character set forth, the combination with a vehicle frame and a main spring, of a shock absorber comprising a casing, means to secure the casing in rigid but adjustable position with respect to the frame, a movable member within the casing, means to connect the end of said main spring to the movable member within the casing, cushioning devices on opposite sides of said member to regulate the slidable movement thereof within the casing, one of said cushioning devices comprising a pair of coil springs one within the other and one shorter than the other under normal conditions, said casing including a cap at one end adapted to coöperate with one of said cushioning springs under a heavy load, the adjacent end of the casing being internally threaded, and a runner coöperating with said internal thread for coöperation with the larger of said springs to vary its effect, substantially as set forth.

In testimony whereof I have signed my name to this specification in the presence of two subscribing witnesses.

HENRY ALBERT AHNERT.

Witnesses:
   GEO. L. BEELER,
   PHILIP D. ROLLHAUS.